United States Patent
Heurtefeux

(10) Patent No.: US 12,549,488 B2
(45) Date of Patent: Feb. 10, 2026

(54) SELECTIVE AND DIVERSE TRAFFIC REPLICATION

(71) Applicant: Infineon Technologies AG, Neubiberg (DE)

(72) Inventor: Karel Heurtefeux, Munich (DE)

(73) Assignee: Infineon Technologies AG, Neubiberg (DE)

( * ) Notice: Subject to any disclaimer, the term of this patent is extended or adjusted under 35 U.S.C. 154(b) by 266 days.

(21) Appl. No.: 18/052,496

(22) Filed: Nov. 3, 2022

(65) Prior Publication Data
US 2024/0154910 A1 May 9, 2024

(51) Int. Cl.
*H04L 47/24* (2022.01)
*H04L 1/22* (2006.01)
*H04L 47/20* (2022.01)

(52) U.S. Cl.
CPC ............... *H04L 47/24* (2013.01); *H04L 1/22* (2013.01); *H04L 47/20* (2013.01)

(58) Field of Classification Search
CPC ............ H04L 47/20; H04L 47/24; H04L 1/22
See application file for complete search history.

(56) References Cited

U.S. PATENT DOCUMENTS

| 7,924,798 | B1* | 4/2011 | Brown | H04L 69/16 370/476 |
| 10,069,747 | B2* | 9/2018 | Chen | H04L 47/11 |
| 10,735,331 | B1* | 8/2020 | Li | H04L 47/2458 |
| 2010/0325271 | A1* | 12/2010 | Krzanowski | H04L 47/11 709/224 |
| 2014/0317237 | A1* | 10/2014 | Barkai | H04N 21/4532 709/219 |
| 2017/0111264 | A1* | 4/2017 | Shankarappa | H04L 47/2483 |
| 2018/0019942 | A1* | 1/2018 | Liang | H04L 45/30 |
| 2018/0098247 | A1* | 4/2018 | Gopal | H04B 7/18519 |
| 2018/0206174 | A1* | 7/2018 | Zhou | H04B 1/0483 |
| 2019/0132286 | A1* | 5/2019 | Holla | H04L 49/70 |
| 2020/0154448 | A1* | 5/2020 | Wilmunder | H04W 76/10 |
| 2020/0178331 | A1* | 6/2020 | Xu | H04W 76/16 |

(Continued)

FOREIGN PATENT DOCUMENTS

| EP | 4246938 A2 * | 9/2023 | ............. H04L 47/58 |
| WO | WO-2004008793 A1 * | 1/2004 | ............. H04L 47/56 |

(Continued)

OTHER PUBLICATIONS

Adriaan de Vos, "Time-Sensitive Networking IEEE 802.1CB: Security and Reliability," Delft University of Technology Master of Science—Computer Science Master Thesis, Jun. 15, 2022, 46 pages.

*Primary Examiner* — Sandarva Khanal
(74) *Attorney, Agent, or Firm* — Harrity & Harrity, LLP

(57) ABSTRACT

A device may provide a traffic flow via a first network interface, the traffic flow including a plurality of frames. The device may identify a plurality of priority metrics associated with the traffic flow, each priority metric of the plurality of priority metrics corresponding to a respective frame of the plurality of frames. The device may generate a replicated traffic flow based on the plurality of priority metrics, the replicated traffic flow including a replicate of a set of frames from the plurality of frames. The device may provide the replicated traffic flow via a second network interface.

20 Claims, 6 Drawing Sheets

(56) References Cited

U.S. PATENT DOCUMENTS

| | | | | |
|---|---|---|---|---|
| 2020/0372795 | A1* | 11/2020 | Szilagyi | H04W 4/44 |
| 2021/0083983 | A1* | 3/2021 | Chin | H04L 63/029 |
| 2021/0344605 | A1* | 11/2021 | Hung | H04L 47/2433 |
| 2022/0255897 | A1* | 8/2022 | Miele | H04L 63/1425 |
| 2022/0345985 | A1* | 10/2022 | Erta | H04L 45/50 |
| 2024/0114390 | A1* | 4/2024 | Pinheiro | H04W 28/0925 |

FOREIGN PATENT DOCUMENTS

| | | | | | |
|---|---|---|---|---|---|
| WO | WO-2014059815 | A1 | * | 4/2014 | H04L 47/12 |
| WO | WO-2015152871 | A1 | * | 10/2015 | H04L 45/021 |
| WO | WO-2017100394 | A1 | * | 6/2017 | H04L 45/245 |
| WO | WO-2019134758 | A1 | * | 7/2019 | G08G 1/0141 |
| WO | WO-2020018704 | A1 | * | 1/2020 | H04L 41/0806 |
| WO | WO-2022057647 | A1 | * | 3/2022 | H04L 63/00 |

* cited by examiner

SELECTIVE AND DIVERSE TRAFFIC REPLICATION

BACKGROUND

Diverse redundancy refers to the use of two or more different systems in association with providing communication between nodes of a network, where each of the two or more different systems utilize different components, different algorithms, different electronics, have different design methodologies, or the like, in association with performing the same task. If implemented, diverse redundancy can increase safety integrity of an electronic system. Notably, diverse redundancy can reduce systematic hardware failure, may reduce a cost associated with providing redundancy in a given system (e.g., as compared to a system that provides non-diverse redundancy), or improve system performance by reducing latency.

SUMMARY

In some implementations, a device includes one or more memories, and one or more processors, coupled to the one or more memories, configured to: provide a traffic flow via a first network interface, the traffic flow including a plurality of frames; identify a plurality of priority metrics associated with the traffic flow, each priority metric of the plurality of priority metrics corresponding to a respective frame of the plurality of frames; generate a replicated traffic flow based on the plurality of priority metrics, the replicated traffic flow including a replicate of a set of frames from the plurality of frames; and provide the replicated traffic flow via a second network interface.

In some implementations, a method includes identifying, by a device, a plurality of priority metrics associated with a traffic flow comprising a plurality of frames, wherein each priority metric of the plurality of priority metrics corresponds to a respective frame of the plurality of frames and the traffic flow is to be provided via a first network interface; generating, by the device, a replicated traffic flow based on the plurality of priority metrics, wherein the replicated traffic flow includes a replicate of a set of frames from the plurality of frames; and providing, by the device, the replicated traffic flow via a second network interface, wherein the first network interface and the second network interface are associated with different systems.

In some implementations, a device includes one or more memories, and one or more processors, coupled to the one or more memories, configured to: receive a traffic flow via a first network interface, the traffic flow including a plurality of frames; receive a replicated traffic flow via a second network interface, the replicated traffic flow including a replicate of a set of frames from the plurality of frames, wherein the first network interface and the second network interface are associated with different systems; and generate a merged traffic flow based on the traffic flow received via the first network interface or the replicated traffic flow received via the second network.

DETAILED DESCRIPTION

Figure 1A:
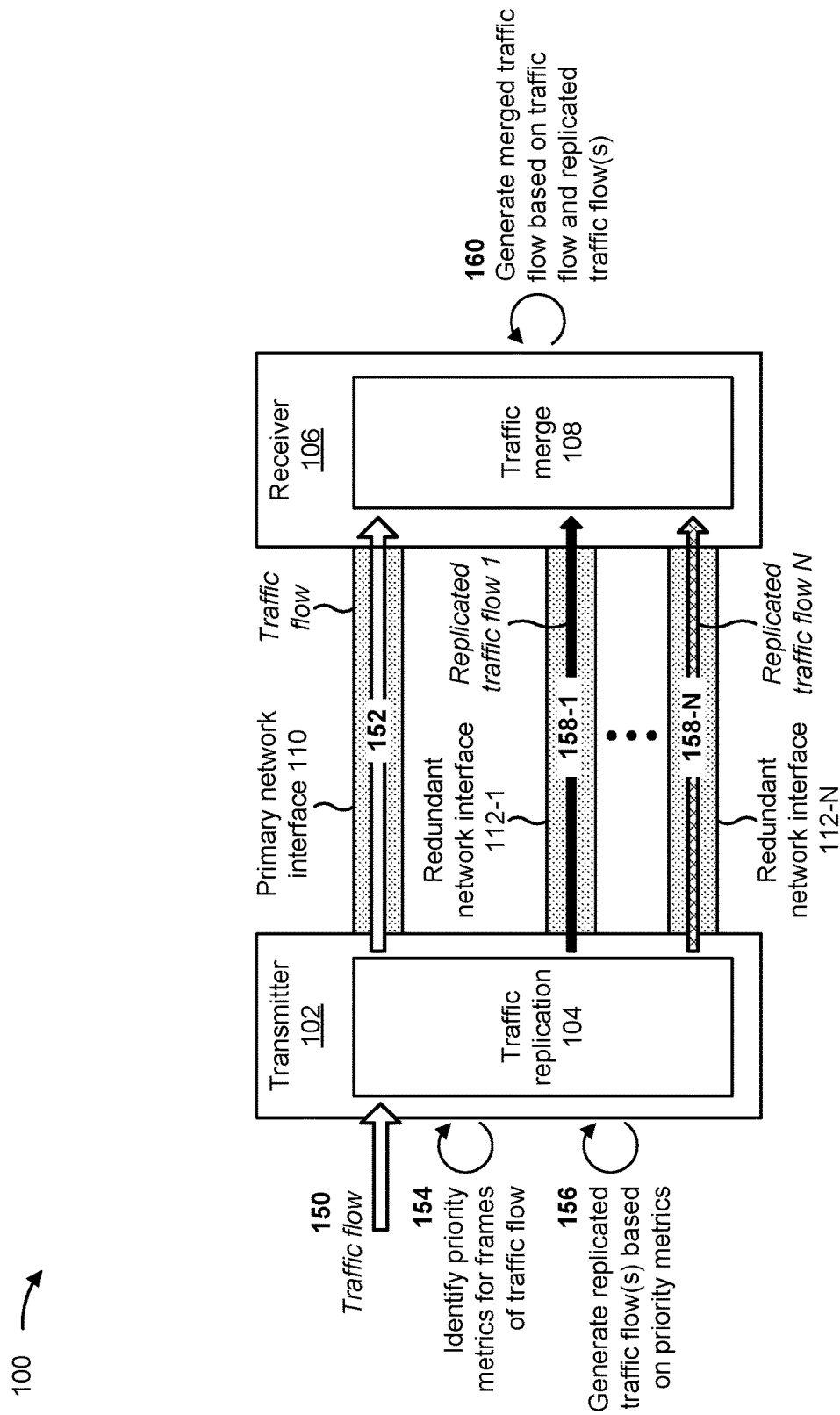
FIGS. 1A-1C are diagrams illustrating examples associated with selective and diverse traffic replication in accordance with the disclosure.

The following detailed description of example implementations refers to the accompanying drawings. The same reference numbers in different drawings may identify the same or similar elements.

Timely delivery of time-sensitive or safety critical data being communicated among devices in a network may be a significant concern in a given application. For example, timely delivery of safety critical data (e.g., braking data, steering data, or the like) being communicated among nodes in an in-vehicle communication network may be required in order to ensure safe operation of a vehicle.

Conventionally, network safety focuses on correctness of data and/or error detection via end-to-end safety mechanisms (e.g., via a cyclic redundancy check (CRC), via a frame identifier, or the like). However, such conventional techniques do not solve disconnection issues. For example, in an in-vehicle communication network, a transmitter and a receiver may be configured to communicate via a network interface, such as a peripheral component interconnect express (PCIe) interface, an Ethernet interface, a WiFi interface, a controller area network (CAN) interface, or a local interconnect network (LIN) interface, among other examples. However, if a network interface supporting communication between the transmitter and the receiver breaks or is otherwise disrupted, then the transmitter and the receiver are unable to communicate. While the conventional techniques mentioned above can determine correctness of data or provide error detection, the conventional techniques do not resolve a network interface disconnection issue.

In some networks, a frame replication scheme may be implemented according to a time-sensitive networking (TSN) standard, such as Institute of Electrical and Electronics Engineers (IEEE) standard 802.1CB. Similarly, in some networks, a high availability protocol may be utilized, such as an International Electrotechnical Commission (IEC) standard 62439. However, these schemes are costly to implement and, therefore, are not well-suited for cost-constrained networks. Furthermore, these schemes do not provide diverse redundancy.

As noted above, diverse redundancy refers to the use of two or more different systems in association with providing communication between nodes of a network. For example, diverse redundancy may be provided where of two or more different systems utilize different components, different algorithms, different electronics, have different design methodologies, or the like, in association with performing a given task. Diverse redundancy can, for example, increase safety integrity of an electronic system or reduce systematic hardware failure. Additionally, diverse redundancy can reduce a cost associated with providing redundancy in a given system as compared to providing non-diverse redundancy in the given system. For example, non-diverse redundancy may be provided in a system that utilizes a higher cost network interface by replicating the higher cost network interface, whereas diverse redundancy may be provided in the system by utilizing a different and lower cost network interface. Further, diverse redundancy can improve system performance by reducing latency. For example, a transmitter in a system without diverse redundancy would need to re-transmit a frame that was not successfully received by a receiver, where such re-transmission may not be needed in a system that provides diverse redundancy.

Some implementations described herein provide techniques and apparatuses for selective and diverse traffic replication. In some implementations, a transmitter may provide a traffic flow, including a plurality of frames, via a first network interface associated with a first system. The transmitter may identify a plurality of priority metrics associated with the traffic flow, where each priority metric of the plurality of priority metrics corresponds to a respective frame of the plurality of frames. The transmitter may then generate a replicated traffic flow based on the plurality of priority metrics. The replicated traffic flow may include a replicate of a set of frames from the plurality of frames. The transmitter may then provide the replicated traffic flow via a second network interface associated with a second system (e.g., a system that is different from the first system). In some implementations, a receiver may receive the traffic flow via the first network interface and may receive the replicated traffic flow via the second network interface. The receiver may then generate a merged traffic flow based on the traffic flow received via the first network interface or the replicated traffic flow received via the second network. In this way, diverse redundancy may be provided in a network, such as an in-vehicle communication network, thereby improving reliability of network communication and increasing a likelihood of timely delivery of time-sensitive or safety critical data. Additional details are provided below.

Figure 1B:
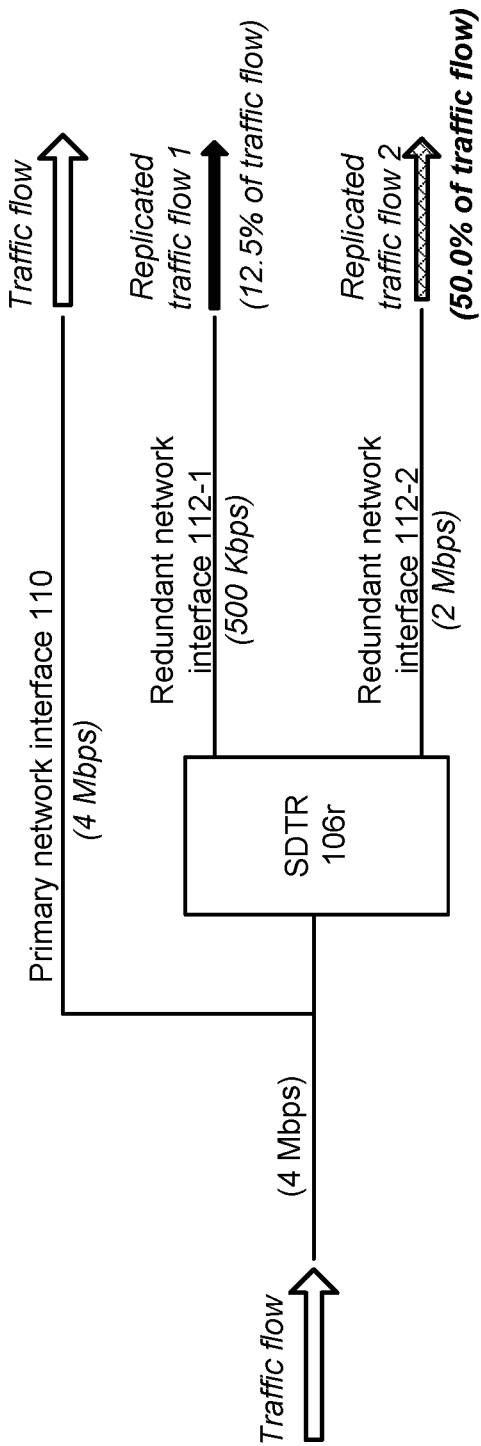
Figure 1C:
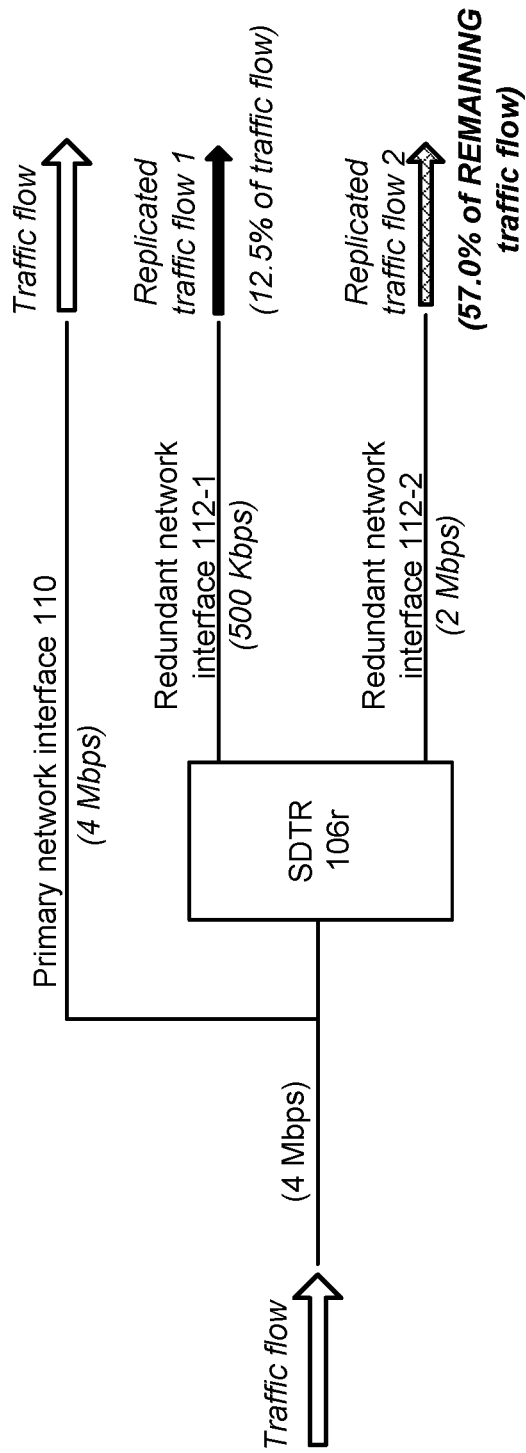

FIGS. 1A-1C are diagrams illustrating examples associated with selective and diverse traffic replication in accordance with the disclosure. As shown in FIG. 1A, an example 100 includes a transmitter 102 comprising a traffic replication component 104 and a receiver 106 comprising a traffic merge component 108. In some implementations, the transmitter 102 and the receiver 106 are included in a communication network, such as an in-vehicle communication network. The devices and components associated with example 100 are described below, followed by a description of an example operation of selective and diverse traffic replication.

The transmitter 102 is a device that is configured to transmit a traffic flow and one or more replicated traffic flows for reception by the receiver 106. In some implementations, the transmitter 102 may receive the traffic flow from another device (not shown) in the communication network (e.g., when the other device is the source of the traffic flow and the transmitter 102 is configured to forward the traffic flow to the receiver 106). Alternatively, the transmitter 102 may in some implementations generate the traffic flow (e.g., the transmitter 102 may be the source of the traffic flow). In some implementations, the transmitter 102 may provide the traffic flow via the primary network interface 110, and may provide the one or more replicated traffic flows via one or more corresponding redundant network interfaces 112, as described herein. As shown, the transmitter 102 may include a traffic replication component 104. The traffic replication component 104 is a component associated with generating the one or more replicated traffic flows to be provided by the transmitter 102 for reception by the receiver 106 via one or more redundant network interfaces 112. For example, in some implementations, the traffic replication component 104 may determine priority metrics associated with frames of the traffic flow, and may generate the one or more replicated traffic flows based on the priority metrics, as described herein.

The receiver 106 is a device that is to receive the traffic flow and the one or more replicated traffic flows provided by the transmitter 102. In some implementations, the receiver 106 may receive the traffic flow via the primary network interface 110, and may receive the one or more replicated traffic flows via one or more corresponding redundant network interfaces 112, as described herein. As shown, the receiver 106 may include a traffic merge component 108. The traffic merge component 108 is a component configured to generate a merged traffic flow based on the traffic flow received via the primary network interface 110 and the one or more replicated traffic flows received via the one or more redundant network interfaces 112.

As shown in FIG. 1A, the transmitter 102 and the receiver 106 may be communicatively coupled via the primary network interface 110 and one or more redundant network interfaces 112-1 through 112-N (N≥1). In some implementations, the primary network interface 110 and the one or more redundant network interfaces 112 are associated with different systems. For example, the primary network interface 110 may be associated with a first system, the redundant network interface 112-1 may be associated with a second system, and the redundant network interface 112-N may be associated with a third system, where the first system, the second system, and the third system are different systems. As used herein, the term "system" refers to a group of devices that utilize a particular set of components, algorithms, electronics, or design methodologies in association with supporting communication between the transmitter 102 and the receiver 106. Therefore, by being associated with different systems, the primary network interface 110 and the one or more redundant network interfaces 112 support diverse redundancy for communication between the transmitter 102 and the receiver 106. In some implementations, a network interface associated with a given system may be, for example, a PCIe interface, an Ethernet interface, a WiFi interface, a CAN interface, or a LIN interface, among other examples. Therefore, in some implementations, the primary network interface 110 and the one or more redundant network interfaces 112 are different types of network interfaces.

In an example of operation, as shown in FIG. 1A by reference 150, the transmitter 102 may obtain the traffic flow to be provided for reception by the receiver 106. In some implementations, the transmitter 102 may receive the traffic flow from another device (not shown) or may generate the traffic flow, as noted above. In some implementations, the traffic flow includes a plurality of frames. As shown by reference 152, the transmitter 102 may provide the traffic flow via the primary network interface 110 for reception by the receiver 106.

As shown by reference 154, the traffic replication component 104 of the transmitter 102 may identify a plurality of priority metrics associated with the traffic flow, where each priority metric of the plurality of priority metrics corresponds to a respective frame of the plurality of frames. A priority metric is an item of information that identifies a priority of the frame (e.g., a priority relative to another frame, an absolute priority, or the like). For example, in some implementations, the priority metric for a given frame may be a differentiated services code point (DSCP) value associated with the frame, a priority code point (PCP) value associated with the frame, a CAN identifier associated with the frame, or another type of information. In some implementations, the priority metric may be included or otherwise indicated in the frame (e.g., in a frame header). Thus, in some implementations, the traffic replication component 104 may inspect the plurality of frames of the traffic flow in order to identify the plurality of priority metrics.

As shown by reference 156, the traffic replication component 104 may generate one or more replicated traffic flows based on the plurality of priority metrics. A replicated traffic flow is a traffic flow including replicates (e.g., duplicates, copies, or the like) of one or more frames from the plurality of frames of the traffic flow.

In some implementations, the traffic replication component 104 may generate a replicated traffic flow based on the priority metrics associated with the traffic flow. In some implementations, the traffic replication component 104 may generate the replicated traffic flow based on a priority threshold associated with a redundant network interface 112 via which the replicated traffic flow is to be provided. For example, the traffic replication component 104 may be configured with a priority threshold associated with a first redundant network interface 112-1. The priority threshold may be, for example, a DSCP value threshold (e.g., a DSCP value of 15), a PCP value threshold (e.g., a PCP value equal to 0), a CAN identifier threshold, or another threshold associated with a priority metric. Here, the traffic replication component 104 may identify frames from the traffic flow that are associated with a priority metric that satisfies the priority threshold, and may generate the replicated traffic flow based on the identified frames (e.g., such that the replicated traffic flow includes the identified frames). As a particular example, the traffic replication component 104 may be configured with a DSCP value threshold of 15 in association with generating a replicated traffic flow for the first redundant network interface 112-1. Here, the traffic replication component 104 may identify frames from the traffic flow that have a DSCP value that is less than or equal to 15, and may generate a first replicated traffic flow, to be provided via the first redundant network interface 112-1, that includes the frames identified as having a DSCP value that is less than or equal to 15.

In some implementations, the traffic replication component 104 may generate multiple replicated traffic flows, where each of the multiple replicated traffic flows is generated based on a corresponding priority threshold. For example, the traffic replication component 104 may generate the first replicated traffic flow associated with the first redundant network interface 112-1 based on the DSCP value threshold of 15, as described in the example above. Continuing with this example, the traffic replication component 104 may be further configured with a second priority threshold, such as a DSCP value threshold of 7, associated with a second redundant network interface 112-2. Here, in addition to the first replicated traffic flow generated based on the DSCP value threshold of 15, the traffic replication component 104 may generate a second replicated traffic flow, to be provided via the second redundant network interface 112-2, that includes frames that have a DSCP value that is less than or equal to 7.

In some implementations, a priority threshold is based on a target data rate for an associated redundant network interface 112. For example, with reference to FIG. 1B, the primary network interface 110 may support a primary data rate (e.g., 4 megabits per second (Mbps)), while a first redundant network interface 112-1 may be configured to support a replicated traffic flow with a first target data rate (e.g., 500 kilobits per second (Kbps)), and a second redundant network interface 112-2 may be configured to support a second replicated traffic flow with a second target data rate (e.g., 2 Mbps). Here, a priority threshold for the first redundant network interface 112-1 and a priority threshold for the second redundant network interface 112-2 may be selected or configured based on the first target data rate and the second target data rate, respectively. For example, as illustrated in FIG. 1B, the first target data rate is 12.5% of the primary data rate (e.g., 500 Kbps/4 Mbps×100%=0.5 Mbps/4 Mbps×100%=0.125×100%=12.5%). Thus, the priority threshold for the first redundant network interface 112-1 may be selected or configured so that approximately a highest priority 12.5% of the traffic flow is included in the first replicated traffic flow. Similarly, as illustrated in FIG. 1B, the second target data rate is 50.0% of the primary data rate (e.g., 2 Mbps/4 Mbps×100%=0.5×100%=50.0%). Here, the priority threshold for the second redundant network interface 112-2 may be selected or configured so that approximately a highest priority 50.0% of the traffic flow is included in the second replicated traffic flow. In some implementations, a composition of the traffic flow with respect to the priority metric is predictable, which enables priority thresholds associated with the redundant network interfaces 112 to be based on the associated target data rates. For example, communication among devices in an in-vehicle communication system may be deterministic, patterned, or otherwise predictable, meaning that a composition of the traffic flow with respect to the priority metric may be predictable. Therefore, a priority threshold associated with a given redundant network interface 112 may be selected or configured based on the target data rate associated with the given redundant network interface 112. For example, a DSCP value threshold of 15 may be configured for the first redundant network interface 112-1 when it is expected that approximately 12.5% of frames will have a DSCP value that is less than or equal to 15.

In some implementations, when the traffic replication component 104 generates multiple replicated traffic flows, one or more frames may be replicated in multiple replicated traffic flows. That is, in some implementations, the traffic replication component 104 may generate a first replicated traffic flow including a first set of frames and may generate a second replicated traffic flow including a second set of frames, where the second set of frames includes one or more frames that are included in the first set of frames. For example, with reference to FIG. 1B, the traffic replication component 104 may generate a first replicated traffic flow, to be provided via the redundant network interface 112-1, that includes the highest priority 12.5% of frames from the traffic flow. As further shown, the traffic replication component 104 may generate a second replicated traffic flow, to be provided via the redundant network interface 112-2, that includes the highest priority 50.0% of frames from the traffic flow. In this example, the second replicated traffic flow includes the highest priority 12.5% of frames (i.e., the frames that are replicated in the first replicated traffic flow). In some implementations, such a replication policy may be referred to as a static replication policy. A static replication policy is a policy that causes the traffic replication component 104 to generate a given replicated traffic flow in a fixed manner or independent of other replicated traffic flows (e.g., irrespective of which frames are included in the other replicated traffic flows). In some implementations, a static replication policy enhances redundancy for one or more frames (e.g., a group of highest priority frames), thereby improving reliability for communication of the one or more frames between the transmitter 102 and the receiver 106.

Additionally, or alternatively, when the traffic replication component 104 generates multiple replicated traffic flows, a given set of frames may be replicated in only one replicated traffic flow. That is, in some implementations, the traffic replication component 104 may generate a first replicated traffic flow including a first set of frames and may generate a second replicated traffic flow including a second set of frames, where the second set of frames does not include any frames that are included in the first set of frames. For example, with reference to FIG. 1C, the traffic replication component 104 may generate the first replicated traffic flow, to be provided via the first redundant network interface 112-1, that includes the highest priority 12.5% of frames from the traffic flow. As further shown, the traffic replication component 104 may generate a second replicated traffic flow, to be provided via the second redundant network interface 112-2, that includes the highest priority 57.0% of remaining frames from the traffic flow (i.e., frames that are not replicated in the first replicated traffic flow). In this example, the second replicated traffic flow does not include the highest priority 12.5% of frames that are replicated in the first replicated traffic flow. Rather, the second replicated traffic flow includes the highest priority 57% of the remaining frames of the traffic flow (e.g., 2 Mbps/(4 Mbps–500 Kbps)×100%=2 Mbps/(4 Mbps–0.5 Mbps)×100%=0.57× 100%=57%). In some implementations, such a replication policy may be referred to as a dynamic distributed replication policy. A dynamic distributed replication policy is a policy that causes the traffic replication component 104 to generate a given replicated traffic flow in a dynamic manner based on frames that are replicated in other replicated traffic flows (e.g., so that frames are not replicated in multiple replicated traffic flows). In some implementations, a dynamic distributed replication policy increases a quantity of frames for which diverse redundancy is provided. In some implementations, the traffic replication component 104 may be configured with a hybrid replication policy that combines static replication and dynamic distributed replication of frames among multiple replicated traffic flows.

Returning to FIG. 1A, as shown by references 158-1 and 158-N, the transmitter 102 may provide the one or more replicated traffic flows via one or more corresponding redundant network interfaces 112. For example, the transmitter 102 may provide a first replicated traffic flow via the redundant network interface 112-1, an $N^{th}$ replicated traffic flow via the redundant network interface 112-N, and so on.

As indicated in FIG. 1A, the receiver 106 may receive the traffic flow via the primary network interface 110 and/or may receive at least one of the one or more replicated traffic flows via the one or more redundant network interfaces 112. As shown by reference 160, the traffic merge component 108 of the receiver 106 may generate a merged traffic flow based on the traffic flow or the one or more replicated traffic flows. In some implementations, the traffic merge component 108 may be configured to generate the merged traffic flow such that the merged traffic flow does not include any replicated frames. That is, the traffic merge component 108 may combine received traffic flows such that, when generating the merged traffic flow, the traffic merge component 108 removes duplicate frames (e.g., such that the merged traffic flow includes only a single copy of a given frame). In some implementations, the traffic merge component 108 may generate the merged traffic based on, for example, a frame number associated with each frame (e.g., such that the traffic merge component 108 removes duplicates of a frame associated with the same frame number).

In some implementations, the traffic merge component 108 may generate the merged traffic flow based on the traffic flow received via the primary network interface 110 and/or any of the one or more replicated traffic flows received via one or more corresponding redundant network interfaces 112. Thus, the traffic merge component 108 may merge the traffic flows received via the different network interfaces in order to generate the merged traffic flow (e.g., for processing by upper layers of the receiver 106).

In this way, diverse redundancy may be provided for communication between the transmitter 102 and the receiver 106, thereby improving reliability of network communication and increasing a likelihood of timely delivery of time-sensitive or safety critical data.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
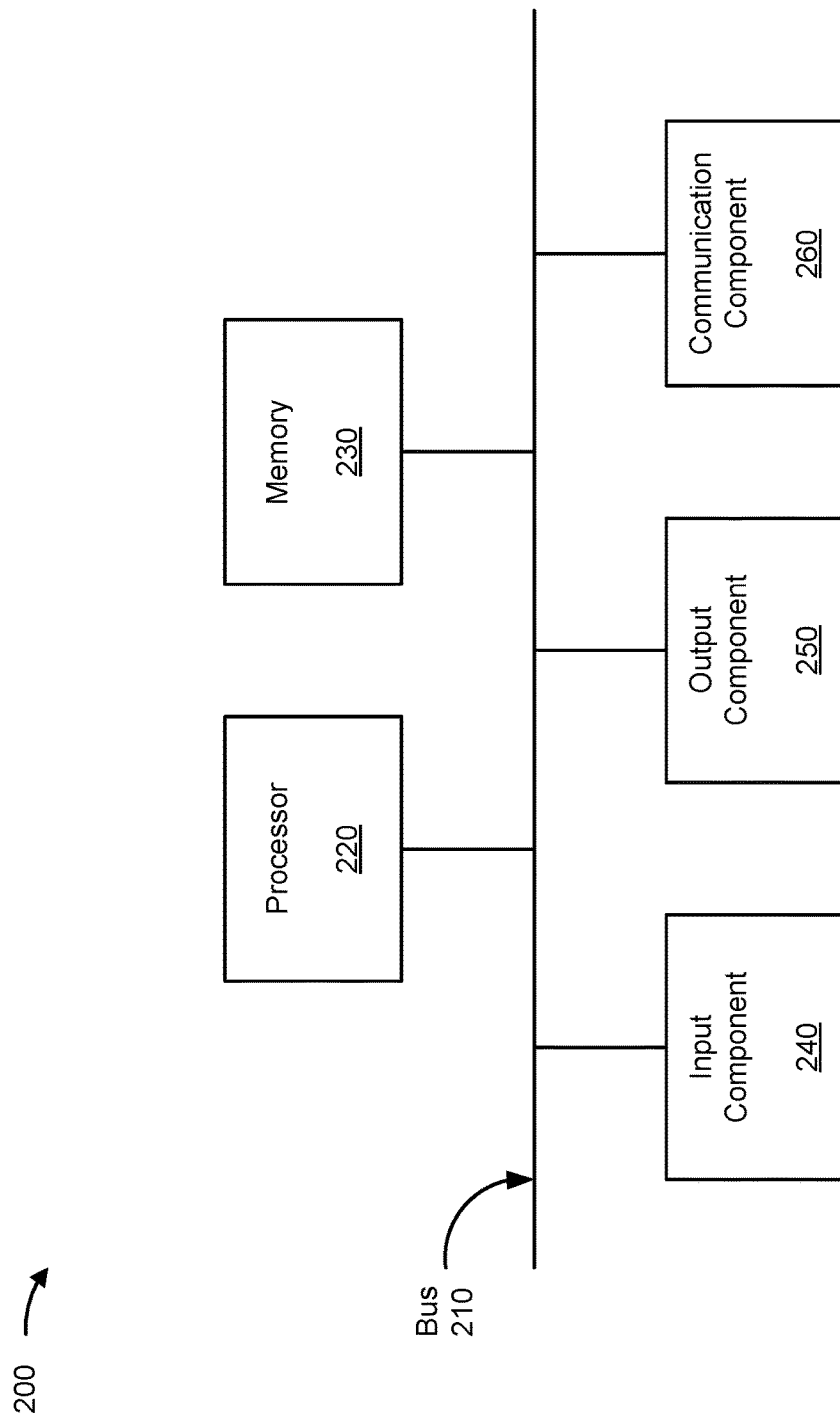
FIG. 2 is a diagram of example components of a device associated with selective and diverse traffic replication in accordance with the disclosure.

FIG. 2 is a diagram of example components of a device 200 associated with selective and diverse traffic replication in accordance with the disclosure. The device 200 may correspond to the transmitter 102, the traffic replication component 104, the receiver 106, and/or the traffic merge component 108. In some implementations, the transmitter 102, the traffic replication component 104, the receiver 106, and/or the traffic merge component 108 may include one or more devices 200 and/or one or more components of the device 200. As shown in FIG. 2, the device 200 may include a bus 210, a processor 220, a memory 230, an input component 240, an output component 250, and/or a communication component 260.

The bus 210 may include one or more components that enable wired and/or wireless communication among the components of the device 200. The bus 210 may couple together two or more components of FIG. 2, such as via operative coupling, communicative coupling, electronic coupling, and/or electric coupling. For example, the bus 210 may include an electrical connection (e.g., a wire, a trace, and/or a lead) and/or a wireless bus. The processor 220 may include a central processing unit, a graphics processing unit, a microprocessor, a controller, a microcontroller, a digital signal processor, a field-programmable gate array, an application-specific integrated circuit, and/or another type of processing component. The processor 220 may be implemented in hardware, firmware, or a combination of hardware and software. In some implementations, the processor 220 may include one or more processors capable of being programmed to perform one or more operations or processes described elsewhere herein.

The memory 230 may include volatile and/or nonvolatile memory. For example, the memory 230 may include random access memory (RAM), read only memory (ROM), a hard disk drive, and/or another type of memory (e.g., a flash memory, a magnetic memory, and/or an optical memory). The memory 230 may include internal memory (e.g., RAM, ROM, or a hard disk drive) and/or removable memory (e.g., removable via a universal serial bus connection). The memory 230 may be a non-transitory computer-readable medium. The memory 230 may store information, one or more instructions, and/or software (e.g., one or more software applications) related to the operation of the device 200. In some implementations, the memory 230 may include one or more memories that are coupled (e.g., communicatively coupled) to one or more processors (e.g., processor 220), such as via the bus 210. Communicative coupling between a processor 220 and a memory 230 may enable the processor 220 to read and/or process information stored in the memory 230 and/or to store information in the memory 230.

The input component 240 may enable the device 200 to receive input, such as user input and/or sensed input. For example, the input component 240 may include a touch screen, a keyboard, a keypad, a mouse, a button, a microphone, a switch, a sensor, a global positioning system sensor, an accelerometer, a gyroscope, and/or an actuator. The output component 250 may enable the device 200 to provide output, such as via a display, a speaker, and/or a light-emitting diode. The communication component 260 may enable the device 200 to communicate with other devices via a wired connection and/or a wireless connection. For example, the communication component 260 may include a receiver, a transmitter, a transceiver, a modem, a network interface card, and/or an antenna.

The device 200 may perform one or more operations or processes described herein. For example, a non-transitory computer-readable medium (e.g., memory 230) may store a set of instructions (e.g., one or more instructions or code) for execution by the processor 220. The processor 220 may execute the set of instructions to perform one or more operations or processes described herein. In some implementations, execution of the set of instructions, by one or more processors 220, causes the one or more processors 220 and/or the device 200 to perform one or more operations or processes described herein. In some implementations, hardwired circuitry may be used instead of or in combination with the instructions to perform one or more operations or processes described herein. Additionally, or alternatively, the processor 220 may be configured to perform one or more operations or processes described herein. Thus, implementations described herein are not limited to any specific combination of hardware circuitry and software.

The number and arrangement of components shown in FIG. 2 are provided as an example. The device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
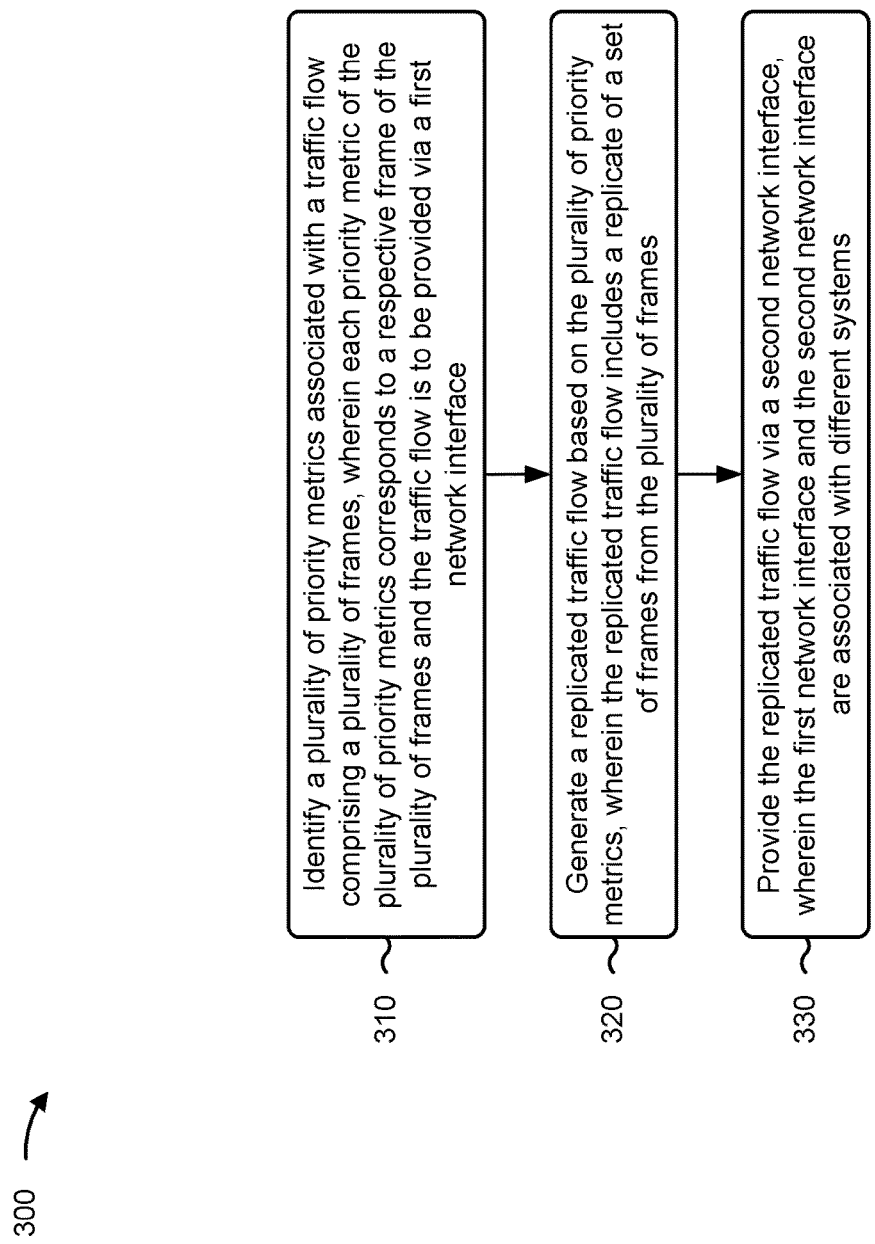
FIG. 3 is a flowchart of an example process associated with selective and diverse traffic replication in accordance with the disclosure.

FIG. 3 is a flowchart of an example process 300 associated with selective and diverse traffic replication in accordance with the disclosure. In some implementations, one or more process blocks of FIG. 3 are performed by a transmitter (e.g., transmitter 102) or a component of the transmitter (e.g., a traffic replication component 104). In some implementations, one or more process blocks of FIG. 3 may be performed by one or more components of device 200, such as processor 220, memory 230, input component 240, output component 250, and/or communication component 260.

As shown in FIG. 3, process 300 may include identifying a plurality of priority metrics associated with a traffic flow comprising a plurality of frames, wherein each priority metric of the plurality of priority metrics corresponds to a respective frame of the plurality of frames and the traffic flow is to be provided via a first network interface (block 310). For example, the transmitter (e.g., using the traffic replication component 104) may identify a plurality of priority metrics associated with a traffic flow comprising a plurality of frames, wherein each priority metric of the plurality of priority metrics corresponds to a respective frame of the plurality of frames and the traffic flow is to be provided via a first network interface (e.g., primary network interface 110), as described above.

As further shown in FIG. 3, process 300 may include generating a replicated traffic flow based on the plurality of priority metrics, wherein the replicated traffic flow includes a replicate of a set of frames from the plurality of frames (block 320). For example, the transmitter (e.g., using the traffic replication component 104) may generate a replicated traffic flow based on the plurality of priority metrics, wherein the replicated traffic flow includes a replicate of a set of frames from the plurality of frames, as described above.

As further shown in FIG. 3, process 300 may include providing the replicated traffic flow via a second network interface, wherein the first network interface and the second network interface are associated with different systems (block 330). For example, the transmitter (e.g., using the traffic replication component 104) may provide the replicated traffic flow via a second network interface (e.g., a first redundant network interface 112), wherein the first network interface and the second network interface are associated with different systems, as described above.

Process 300 may include additional implementations, such as any single implementation or any combination of implementations described below and/or in connection with one or more other processes described elsewhere herein.

In a first implementation, the replicated traffic flow is generated further based on a priority threshold associated with the second network interface.

In a second implementation, in combination with the first implementation, the priority threshold is based on a target data rate for the second network interface.

In a third implementation, alone or in combination with one or more of the first and second implementations, the replicated traffic flow is a first replicated traffic flow and the set of frames is a first set of frames, and process 300 includes generating a second replicated traffic flow based on the plurality of priority metrics, wherein the second replicated traffic flow includes a replicate of a second set of frames from the plurality of frames, and providing the second replicated traffic flow via a third network interface (e.g., a second redundant network interface 112).

In a fourth implementation, alone or in combination with one or more of the first through third implementations, the first replicated traffic flow is generated further based on a first priority threshold associated with the second network interface, and the second replicated traffic flow is generated further based on a priority threshold associated with the third network interface.

In a fifth implementation, in combination with the fourth implementation, the second set of frames includes one or more frames that are included in the first set of frames.

In a sixth implementation, in combination with the fourth implementation, the second set of frames does not include any frames that are included in the first set of frames.

In a seventh implementation, alone or in combination with one or more of the first through sixth implementations, process 300 includes determining that a static replication policy is to be applied to the traffic flow, wherein the replicated traffic flow is generated further based on the static replication policy.

In an eighth implementation, alone or in combination with one or more of the first through seventh implementations, process 300 includes determining that a dynamic distributed replication policy is to be applied to the traffic flow, wherein the replicated traffic flow is generated further based on the dynamic distributed replication policy.

In a ninth implementation, alone or in combination with one or more of the first through eighth implementations, the one or more priority metrics include one or more differentiated services code point values, one or more priority code point values, or one or more controller area network identifiers.

Although FIG. 3 shows example blocks of process 300, in some implementations, process 300 includes additional blocks, fewer blocks, different blocks, or differently arranged blocks than those depicted in FIG. 3. Additionally, or alternatively, two or more of the blocks of process 300 may be performed in parallel.

Figure 4:
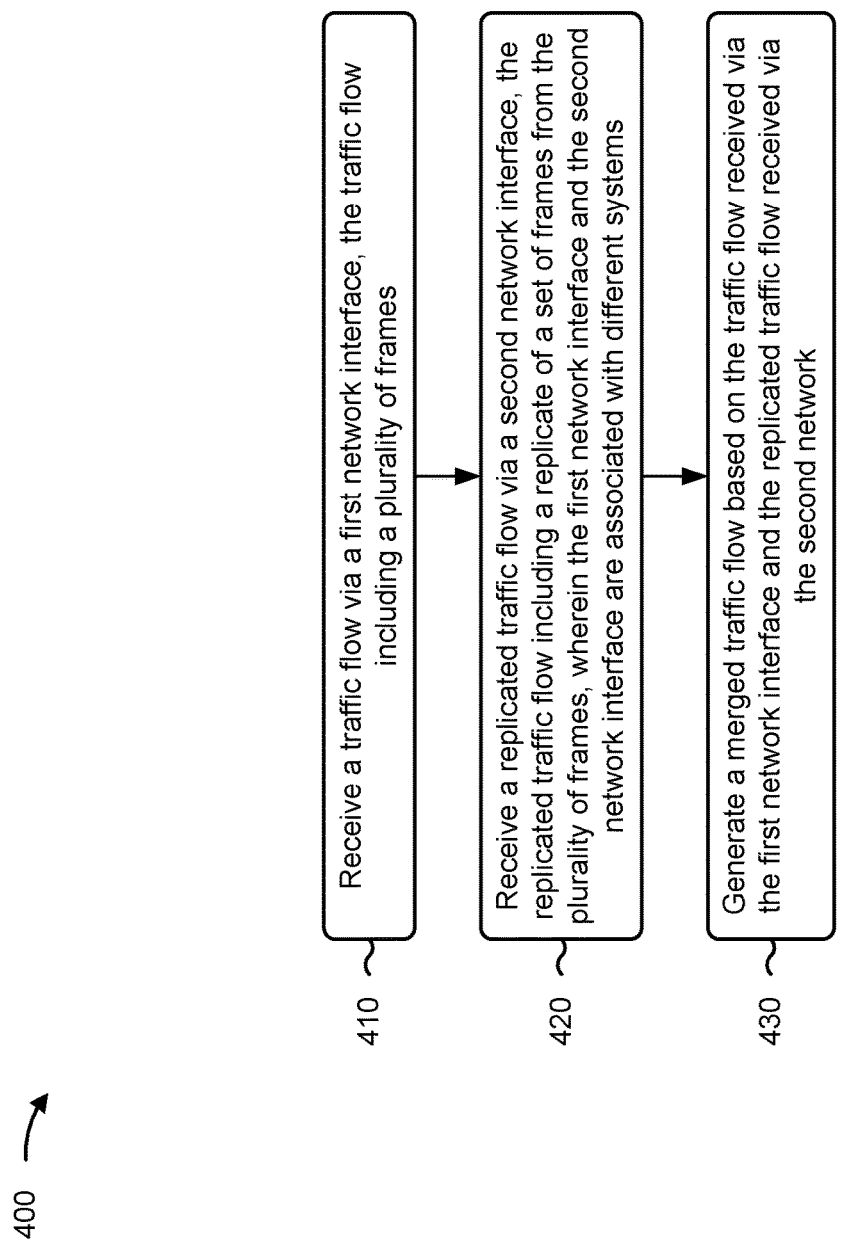
FIG. 4 is a flowchart of an example process associated with selective and diverse traffic replication in accordance with the disclosure.

FIG. 4 is a flowchart of an example process 400 associated with selective and diverse traffic replication in accordance with the disclosure. In some implementations, one or more process blocks of FIG. 4 are performed by a receiver (e.g., receiver 104) or a component of the receiver (e.g., a traffic merge component 108). In some implementations, one or more process blocks of FIG. 4 may be performed by one or more components of device 200, such as processor 220, memory 230, input component 240, output component 250, and/or communication component 260.

As shown in FIG. 4, process 400 may include receiving a traffic flow via a first network interface, the traffic flow including a plurality of frames (block 410). For example, the receiver may receive a traffic flow via a first network interface (e.g., the primary network interface 110), the traffic flow including a plurality of frames, as described above.

As further shown in FIG. 4, process 400 may include receiving a replicated traffic flow via a second network interface, the replicated traffic flow including a replicate of a set of frames from the plurality of frames, wherein the first network interface and the second network interface are associated with different systems (block 420). For example, the receiver may (e.g., using the traffic merge component 108) receive a replicated traffic flow via a second network interface (e.g., a first redundant network interface 112), the replicated traffic flow including a replicate of a set of frames from the plurality of frames, wherein the first network interface and the second network interface are associated with different systems, as described above.

As further shown in FIG. 4, process 400 may include generating a merged traffic flow based on the traffic flow received via the first network interface or the replicated traffic flow received via the second network (block 430). For example, the receiver may (e.g., using the traffic merge component 108) generate a merged traffic flow based on the traffic flow received via the first network interface or the replicated traffic flow received via the second network, as described above.

Process 400 may include additional implementations, such as any single implementation or any combination of implementations described below and/or in connection with one or more other processes described elsewhere herein.

In a first implementation, generating the merged traffic flow comprises generating the merged traffic flow such that the merged traffic flow does not include any replicated frames.

In a second implementation, alone or in combination with the first implementation, process 400 includes receiving a second replicated traffic flow via a third network interface (e.g., a second redundant network interface 112), wherein the second replicated traffic flow includes a replicate of a second set of frames from the plurality of frames, and generating the merged traffic flow comprises generating the merged traffic flow further based on the second replicated traffic flow.

In a third implementation, in combination with the second implementation, the second set of frames includes one or more frames that are included in the first set of frames.

In a fourth implementation, in combination with the second implementation, the second set of frames does not include any frames that are included in the first set of frames.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
one or more memories; and
one or more processors, coupled to the one or more memories, configured to:
obtain a traffic flow comprising a plurality of frames to be provided for reception by a receiver;
provide the traffic flow via a primary network interface of a plurality of network interfaces;
identify a plurality of priority metrics associated with the traffic flow, each priority metric of the plurality of priority metrics corresponding to a respective frame of the plurality of frames;
generate a first replicated traffic flow and a second replicated traffic flow based on the plurality of priority metrics, the first replicated traffic flow including a first replicate of a first set of frames from the plurality of frames and the second replicated traffic flow including a second replicate of a second set of frames from the plurality of frames;
provide the first replicated traffic flow via a first redundant network interface of the plurality of network interfaces,
wherein the first redundant network interface is selected from the plurality of network interfaces based on determining whether the plurality of priority metrics satisfy a first priority threshold associated with the first redundant network interface, and
wherein the first priority threshold is based on a first target data rate for the first redundant network interface; and
provide the second replicated traffic flow via a second redundant network interface of the plurality of network interfaces,
wherein the second redundant network interface is selected from the plurality of network interfaces based on determining whether the plurality of priority metrics satisfy a second priority threshold associated with the second redundant network interface,
wherein the second priority threshold is based on a second target data rate for the second redundant network interface, and is configured to be a higher value than the first priority threshold,
wherein the second replicated traffic flow includes data provided in the first replicated traffic flow and additional data based on determining whether the plurality of priority metrics satisfy the second priority threshold associated with the second redundant network interface, and
wherein the primary network interface, the first redundant network interface and the second redundant network interface are different types of network interfaces.

2. The device of claim 1, wherein the one or more processors are configured to generate the first replicated traffic flow further based on the first priority threshold associated with the first redundant network interface.

3. The device of claim 1, wherein the first replicated traffic flow is generated according to a static replication policy.

4. The device of claim 1, wherein the first replicated traffic flow is generated according to a dynamic distributed replication policy.

5. The device of claim 1, wherein the plurality of priority metrics include one or more differentiated services code point values, one or more priority code point values, or one or more controller area network identifiers.

6. The device of claim 1, wherein the primary network interface is associated with a first system and each of the first redundant network interface and the second redundant network interface is associated with a system that is different from the first system.

7. The device of claim 1, wherein the plurality of priority metrics are included in frame headers.

8. A method, comprising:
obtaining, by a device, a traffic flow comprising a plurality of frames to be provided for reception by a receiver;
providing, by the device, the traffic flow via a primary network interface of a plurality of network interfaces;
identifying, by the device, a plurality of priority metrics associated with the traffic flow, wherein each priority metric of the plurality of priority metrics corresponds to a respective frame of the plurality of frames;
generating, by the device, a first replicated traffic flow and a second replicated traffic flow based on the plurality of priority metrics, wherein the first replicated traffic flow includes a first replicate of a first set of frames from the plurality of frames and the second replicated traffic flow including a second replicate of a second set of frames from the plurality of frames;
providing, by the device, the first replicated traffic flow via a first redundant network interface of the plurality of network interfaces, wherein the primary network interface and the first redundant network interface are associated with different systems,
wherein the first redundant network interface is selected from the plurality of network interfaces based on determining whether the plurality of priority metrics satisfy a first priority threshold associated with the first redundant network interface, and
wherein the first priority threshold is based on a first target data rate for the first redundant network interface; and
providing the second replicated traffic flow via a second redundant network interface of the plurality of network interfaces,
wherein the second redundant network interface is selected from the plurality of network interfaces based on determining whether the plurality of priority metrics satisfy a second priority threshold associated with the second redundant network interface,
wherein the second priority threshold is based on a second target data rate for the second redundant network interface, and is configured to be a higher value than the first priority threshold,
wherein the second replicated traffic flow includes data provided in the first replicated traffic flow and additional data based on determining whether the plurality of priority metrics satisfy the second priority threshold associated with the second redundant network interface, and
wherein the primary network interface, the first redundant network interface, and the second redundant network interface are different types of network interfaces.

9. The method of claim 8, wherein the first replicated traffic flow is generated further based on the first priority threshold associated with the first redundant network interface.

10. The method of claim 8, further comprising determining that a static replication policy is to be applied to the traffic flow, wherein the first replicated traffic flow is generated further based on the static replication policy.

11. The method of claim 8, further comprising determining that a dynamic distributed replication policy is to be applied to the traffic flow, wherein the first replicated traffic flow is generated further based on the dynamic distributed replication policy.

12. The method of claim 8, wherein the plurality of priority metrics include one or more differentiated services code point values, one or more priority code point values, or one or more controller area network identifiers.

13. The method of claim 8, wherein the plurality of priority metrics are included in frame headers.

14. A non-transitory computer-readable medium storing a set of instructions, the set of instructions comprising:
  one or more instructions that, when executed by one or more processors of a device, cause the device to:
    obtain a traffic flow comprising a plurality of frames to be provided for reception by a receiver;
    provide the traffic flow via a primary network interface of a plurality of network interfaces;
    identify a plurality of priority metrics associated with the traffic flow, each priority metric of the plurality of priority metrics corresponding to a respective frame of the plurality of frames;
    generate a first replicated traffic flow and a second replicated traffic flow based on the plurality of priority metrics, the first replicated traffic flow including a first replicate of a first set of frames from the plurality of frames and the second replicated traffic flow including a second replicate of a second set of frames from the plurality of frames;
    provide the first replicated traffic flow via a first redundant network interface of the plurality of network interfaces,
      wherein the first redundant network interface is selected from the plurality of network interfaces based on determining whether the plurality of priority metrics satisfy a first priority threshold associated with the first redundant network interface, and
      wherein the first priority threshold is based on a first target data rate for the first redundant network interface; and
    provide the second replicated traffic flow via a second redundant network interface of the plurality of network interfaces,
      wherein the second redundant network interface is selected from the plurality of network interfaces based on determining whether the plurality of priority metrics satisfy a second priority threshold associated with the second redundant network interface,
      wherein the second priority threshold is based on a second target data rate for the second redundant network interface, and is configured to be a higher value than the first priority threshold,
      wherein the second replicated traffic flow includes data provided in the first replicated traffic flow and additional data based on determining whether the plurality of priority metrics satisfy the second priority threshold associated with the second redundant network interface, and
      wherein the primary network interface, the first redundant network interface and the second redundant network interface are different types of network interfaces.

15. The non-transitory computer-readable medium of claim 14, wherein the one or more instructions, that cause the device to generate the first replicated traffic flow, cause the device to:
  generate the first replicated traffic flow further based on the first priority threshold associated with the first redundant network interface.

16. The non-transitory computer-readable medium of claim 14, wherein the primary network interface is associated with a first system and the first redundant network interface is associated with a second system that is different from the first system.

17. The non-transitory computer-readable medium of claim 14, wherein the first replicated traffic flow is generated according to a static replication policy.

18. The non-transitory computer-readable medium of claim 14, wherein the first replicated traffic flow is generated according to a dynamic distributed replication policy.

19. The non-transitory computer-readable medium of claim 14, wherein the plurality of priority metrics are associated with a differentiated services code (DSCP) value, a priority code point (PCP) value, or a controller area network (CAN) identifier.

20. The non-transitory computer-readable medium of claim 14, wherein the plurality of priority metrics are included in frame headers.

* * * * *